Figure 1:
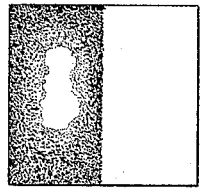

No. 611,380. Patented Sept. 27, 1898.
J. JACOBSON.
COLORED PICTURE.
(Application filed Nov. 23, 1896.)

(No Model.)

Witnesses:
Jas. J. Maloney.
H. J. Livermore.

Inventor:
John Jacobson.
by Jos. P. Livermore
atty.

THE NORRIS PETERS CO., PHOTO-LITHO., WASHINGTON, D. C.

United States Patent Office.

JOHN JACOBSON, OF BOSTON, MASSACHUSETTS.

COLORED PICTURE.

SPECIFICATION forming part of Letters Patent No. 611,380, dated September 27, 1898.

Application filed November 23, 1896. Serial No. 613,078. (No specimens.)

*To all whom it may concern:*

Be it known that I, JOHN JACOBSON, of Boston, county of Suffolk, and State of Massachusetts, have invented an Improvement in Art Reproduction, of which the following description, in connection with the accompanying drawings, is a specification, like letters on the drawings representing like parts.

The present invention relates to a process for art-reproduction work, the essential steps of the process consisting in obtaining a half-tone positive photographic plate by first obtaining a negative plate of the picture or object to be reproduced and then a positive plate from the said negative plate, (the word "positive" in this case being used with relation to the original picture, it being, strictly speaking, a negative of the negative,) the half-tone screen being once used in the operation, so that the positive plate is a half-tone photographic plate. The next step in the process is the formation of a metallic half-tone plate by exposing a sensitized metal plate to the action of light through the said half-tone photographic positive and then etching the same.

It is to be understood that in the first or essential step of the process—that is, the obtaining of the half-tone photographic positive—the camera and half-tone screen are but once used, it being preferable, though not essential, to use the half-tone screen in conjunction with the first photographic exposure in the camera to obtain the half-tone negative, the positive then being obtained by the printing process.

The above-described process is especially intended for use in the ornamentation of the surfaces of metals or other hard substances—such as aluminium, silver, gold, or preferably celluloid, which is much used in the arts. For this purpose a die is formed by pressure or otherwise from the metal plate obtained as above described, and the said die is then used for stamping any hard smooth surface, as that of the materials above enumerated, the result being that the said surfaces will be an exact reproduction in shape and configuration of the positive half-tone metal plate above described, the parts corresponding to high lights being practically smooth flat surfaces and the parts corresponding to shadows being more or less indented by lines and dots in accordance with the intensity of light and shade in the object or picture which is reproduced. The said surface thus prepared may then be suitably colored by applying coloring-matter or pigments thereto, which will be repelled by the smooth surfaces which correspond to the high lights and will cling to the roughened surfaces in a greater or less quantity, according to the dimensions of the lines and dots which are the result of the half-tone process, thus exactly reproducing the gradations of light and shade.

Figure 2:
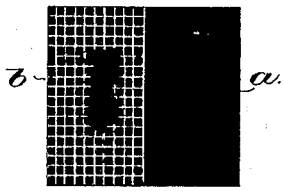
Figure 3:
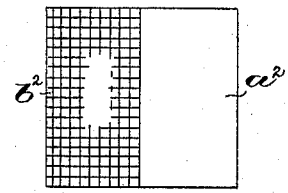
Figure 4:
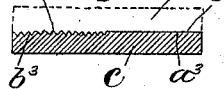
Figure 5:
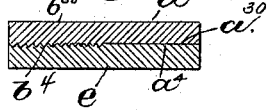
Figure 6:
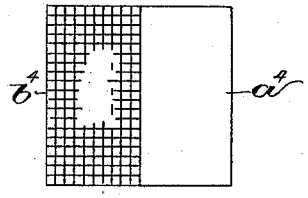

Figure 1 is a conventional representation of an object or picture to be reproduced. For convenience a sharp line of demarcation is drawn between the right-hand side of the picture, which is to represent the high lights, and the left-hand side, which is to represent the graded shades. Fig. 2 represents a negative photographic plate taken from the said picture with the half-tone screen interposed. Fig. 3 represents a positive photographic plate taken by a contact exposure from the negative shown in Fig. 2. Fig. 4 represents a cross-section of a sensitized metal plate prepared by etching after a contact exposure from the positive, Fig. 3. Fig. 5 represents, also in cross-section, the die produced in accordance with this invention and the article to be ornamented in the process of being formed thereby; and Fig. 6 represents the finished reproduction of the picture shown in Fig. 1.

It is to be understood, of course, that all of the drawings are greatly exaggerated to clearly illustrate the invention, and it may be stated here that in practice there should be in the half-tone screen used from one hundred and fifty to two hundred lines to the inch, as in the usual half-tone process.

In Fig. 2, which represents a negative taken from the picture shown in Fig. 1, the part $a$, corresponding to the right-hand half of Fig. 1, which shows the high lights, will be practically opaque after the negative has been developed and will not have any representation of lines upon it, since the quantity of light is such as to eat in behind the lines of the half-tone screen and affect substantially the whole surface of the negative, as is well known in the half-tone process. The part $b$, representing the lights and shades in gradation, will also be opaque in the parts between the white lines, which represent the effect of the light on the negative with the half-tone screen interposed.

In accordance with the present invention instead of making the metal plate from the negative (indicated in Fig. 2) another photographic plate is prepared by contact exposure with the negative, Fig. 2, and a positive, which is indicated in Fig. 3, obtained thereby, the portion $a^2$ of which is transparent and the portion $b^2$ transparent except where the lines are shown, the said portions $a^2$ and $b^2$ corresponding, respectively, with the portions $a$ and $b$, Fig. 2. A plate is then prepared by exposing in contact with the positive (shown in Fig. 3) a sensitized metal plate which will be affected by the light in the portion of its surface corresponding to the portion $a^2$ of the positive, Fig. 3, and the portion shown between the black lines at $b^2$ in the same figure. Fig. 4 (full lines) represents in cross-section a plate $c$ thus prepared after it has been exposed and etched, the part corresponding to the high lights being, as shown at $a^3$, a substantially smooth surface, while the part corresponding to the shades, as shown at $b^3$, consists of a surface channeled or depressed to correspond with the black lines shown in Fig. 3, the metal being eaten away in the parts where the light has not reached it. From the plate $c$ (shown in Fig. 4) another plate $d$ is then produced, as indicated in dotted lines in the same figure, the said plate being formed either by pressing a polished plate of softer material against the face of the plate $c$, as indicated, or by any suitable process, such as an electrotyping process, the result being that the surface of the part $a^3$, which is smooth and which corresponds to the high lights in the picture, is, as shown, reproduced in the surface $a^{30}$ of the plate $d$, which surface is depressed beyond the surface $b^{30}$, reproduced on said plate $d$ by the surface $b^3$ of the plate $c$, the entire extent of the smooth unbroken surface $a^{30}$ being at a level beyond that of the channeled or indented surface $b^{30}$. The article $e$, which is to be ornamented according to the process, the said article being made, for example, from celluloid or aluminium, is then formed, as shown in Fig. 5, by means of pressure in conjunction with the plate $d$. The surface of the said article is thus left smooth at $a^4$, where it is formed by the surface $a^{30}$ of the plate $d$, Fig. 5, the said portion $a^4$ projecting beyond the portion $b^4$, which is formed by the surface $e^{30}$, the said portion $b^4$, as shown in Fig. 6, being divided into crisscross-channels indicated by the lines, the said channels corresponding to the lines of the half-tone plate and being of varying width and distinctness in different parts, according to the gradations of light and shade in that part of the original picture, Fig. 1, which shows the gradations of shade. The article $e$ is then finished by applying to its surface a suitable ink or pigment which will not adhere to the smooth portion $a$, but which will fill in the grooves or depressions in the portion $b$, a varying amount of ink being retained, according to the width or distinctness of the channels. The ink or pigment may be applied in any suitable or usual way, as by merely rubbing it over the prepared surface, it being further practicable, however, in the case of metals to cover the high parts with greasy matter, as by a roller, such matter not entering the depressions, and then subjecting the article to fumes which will oxidize the exposed parts—i. e., the depressions—after which the greasy substance is removed.

It is to be understood, of course, that the high lights which are represented at $a$ would correspond to the high lights in various parts of an ordinary picture and that the channeled portion and smooth portion would run together by imperceptible gradations, so that a perfect reproduction of the picture would be produced with substantially the same effect which is obtained by a print on paper from a half-tone plate.

The ornamentation of the article when produced in this way is practically indestructible, since the ink is retained in the fine surface indentations, from which it is practically impossible to remove it, so that the picture will last as long as the actual surface of the article will resist wear.

The process is especially valuable in connection with celluloid articles—such as hairbrushes, mirrors, and the like—since very artistic results are obtainable with a slight expense, it being obvious, moreover, that articles made of aluminium or any metal which can be formed by pressure in conjunction with a molding-surface, as that of the die or plate $d$ described, may be treated in the same way.

This process may also be used in conjunction with various kinds of molding and embossing processes, so that the pictures produced thereby may be surrounded by fancy borders and the like, whereby very effective combinations may be obtained.

I claim—

1. The herein-described method of reproducing pictures on a hard surface as that of metal or celluloid, which consists in first photographically obtaining a half-tone plate, and then molding the said surface by pressure in conjunction with said plate, and finally treating said molded surface with coloring-matter or pigment, which is retained in the depressions formed by the molding process, substantially as described.

2. The herein-described process of producing art reproductions on hard surfaces, which consists in producing a negative photographic plate in conjunction with the half-tone screen, obtaining a positive photographic plate therefrom, preparing a metal plate from said positive photographic plate by contact exposure and etching, and using said plate as a matrix for the production of a die, forming the surface upon which the reproduction is to be made, by means of said die, and applying ink or pigment to the surface thus formed, substantially as described.

In testimony whereof I have signed my name to this specification in the presence of two subscribing witnesses.

JOHN JACOBSON.

Witnesses:
H. J. LIVERMORE,
JAS. J. MALONEY.